United States Patent [19]

Hennig et al.

[11] Patent Number: 4,516,155

[45] Date of Patent: May 7, 1985

[54] METHOD FOR PARTIALLY SMOOTHING RETOUCH IN ELECTRONIC COLOR REPRODUCTION

[75] Inventors: Eberhard Hennig, Ascheberg; Jürgen Klie, Toekendorf; Klaus Wellendorf, Kitzeberg, all of Fed. Rep. of Germany

[73] Assignee: Dr. Ing. Rudolf Hell GmbH, Fed. Rep. of Germany

[21] Appl. No.: 358,850

[22] Filed: Mar. 17, 1982

[30] Foreign Application Priority Data

Mar. 17, 1981 [DE] Fed. Rep. of Germany ....... 3110222

[51] Int. Cl.$^3$ ............................................ H04N 1/46
[52] U.S. Cl. ....................................... 358/80; 358/78
[58] Field of Search .................. 358/80, 75, 78, 21 R, 358/22, 27, 28

[56] References Cited

U.S. PATENT DOCUMENTS

| | | | |
|---|---|---|---|
| 3,941,755 | 3/1976 | Chapman et al. | 260/78 R |
| 4,017,894 | 4/1977 | Akami et al. | 358/80 |
| 4,189,743 | 2/1980 | Schure | 358/80 |
| 4,236,174 | 11/1980 | Gall | 358/22 |
| 4,285,009 | 8/1981 | Klopsch | 358/76 |
| 4,307,962 | 12/1981 | Jung | 358/80 |
| 4,328,515 | 5/1982 | Wellendorf | 358/80 |
| 4,349,279 | 9/1982 | Jung | 358/80 |

FOREIGN PATENT DOCUMENTS 2300515  7/1973  Fed. Rep. of Germany .

Primary Examiner—Tommy P. Chin
Attorney, Agent, or Firm—Hill, Van Santen, Steadman & Simpson

[57] ABSTRACT

A method for smoothing retouch in electronic color image reproduction employs a coordinate pen used by the retoucher as a retouch brush, to identify image point coordinates within an image point area. The color values associated with the image point coordinates are changed as a function of the color values of the nearby image point coordinates. The size of the areas which have their color values changed is operator-selectable. The color values of the areas which are changed can be matched to the marginal values of the area, or may be replaced by a mean value of the color values within the area. By this means image contours may be flattened, and the effective noise in the image surfaces may be minimized.

17 Claims, 17 Drawing Figures

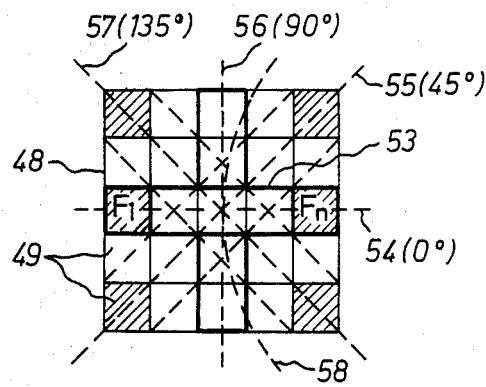
Fig. 5
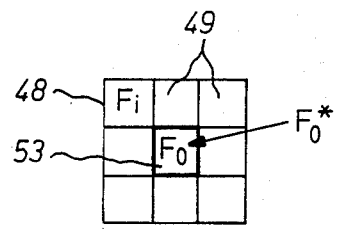
Fig. 9
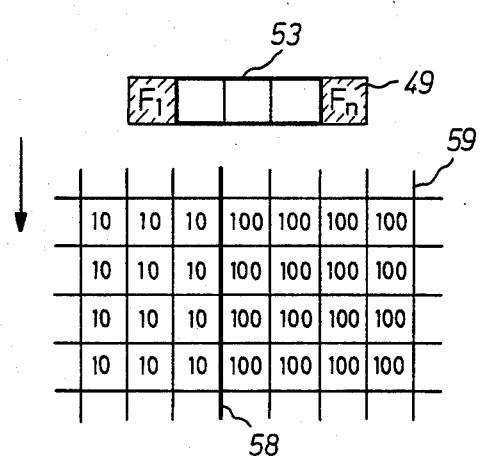
Fig. 6a
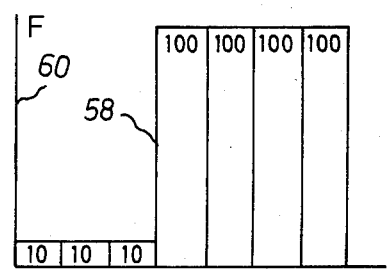
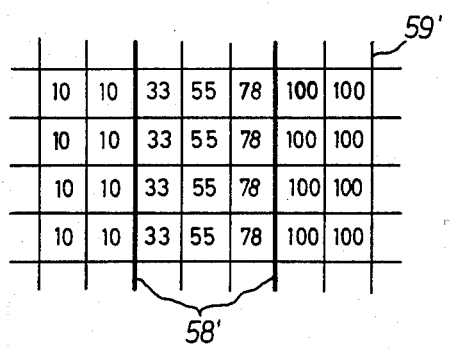
Fig. 6b
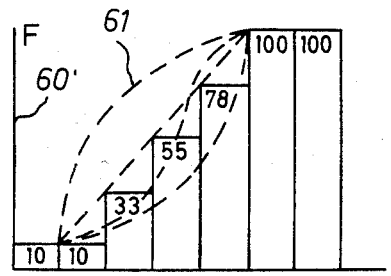

METHOD FOR PARTIALLY SMOOTHING RETOUCH IN ELECTRONIC COLOR REPRODUCTION

BACKGROUND

1. Field of the Invention

This invention relates to a method for partially smoothing retouch techniques in electronic reproduction of color images, and more particularly to the production of corrected and retouched color separations by means of an electronic image processing system.

2. Prior Art

In electronic reproduction, three signals representing measured primary color values are produced by a color scanner by means of opto-electronic scanning, such signals representing the color components red, green and blue of the scanned image points. A color correction computer corrects the color by altering the measured value signals and generates color separation signals therefrom which are required for the production of color separation. Color separation signals represent a measure of the amounts of ink required in the later printing. The color separation signals are digitized and deposited in a storage medium as digital color values of each point in an image.

In an image processing system, the stored color values of various individual masters can be united according to a layout plan to form a data set for an overall page. Also, partial retouches (in which the color value and/or tint value is corrected) can be carried out. Partial retouches, i.e., retouches limited to selectable, limited image parts, are necessary in order to optimize the correction which has been carried out in the color correction computer or to make editorial changes.

For the purpose of recording the retouched color separations, the corrected color values are read out of the memory medium, then converted back into analog color separation signals, and then supplied to a color scanner in which the rastered or unrastered color separations "magenta", "cyan", "yellow" and "black" are exposed for the production of printing forms.

A method for electronic partial retouch has been proposed in the U.S. Pat. No. 4,393,399 in which the digital color values are changed under visual control on a color monitor, image-point-by-image-point. The disclosure of this patent is incorporated hereinto by reference. Such retouching is partially in accord with the desired retouch effects in the color image, or in the color separation, by correction values which are image point-dependent. The image point coordinates of the color values to be retouched, and the desired amount of retouch, are determined with the assistance of a coordinate pen of a coordinate identification device. To this end, the retoucher guides the coordinate pen across the image part to be retouched like a retouch brush, and the retouch degree for the individual image points is derived from the positions where the coordinate pen contacts the corresponding image points. In order to be able to retouch larger image parts more quickly, the plurality of image points covered with each contact of the coordinate pen within an image point area must be increased, this corresponding to an enlargement of the "brush surface".

When copying images with sharp transitions from one surface into another, the subjective impression of a relief image arises, suggesting the impression that the images were not copied into one another but rather, onto one another. Therefore, a typical retouch job requires, among other things, the partial defocusing, flattening or weakening of such contours (density skips).

Another retouch job is the partial matching, leveling or smoothing of different color or tint values of an image.

Although flattenings and matchings can be carried out with the retouch method specified in the cited patent, such a process is time-intensive, particularly when smooth transitions without noticeable density stages are to be achieved, since the coordinate pen must be conducted over the image part to be retouched in movements which lie close to one another.

BRIEF DESCRIPTION OF THE INVENTION

It is therefore a principal object of the present invention to provide a method for partially smoothing retouch in electronic color image reproduction which improves upon the known method so that flattenings at contours, and matching of color or tint values can be carried out more simply, more precisely and in a shorter time.

This and other objects and advantages of the invention will become manifest by a review of the following description and the accompanying drawings.

BRIEF DESCRIPTION OF THE DRAWINGS

The invention is described in greater detail on the basis of FIGS. 1 through 13, in which;

FIG. 5 illustrates a brush surface;

FIG. 6a and 6b show a graphic illustration for the flattening of contours;

FIG. 9 illustrates a further brush surface;

THE PREFERRED EMBODIMENT

Figure 1:
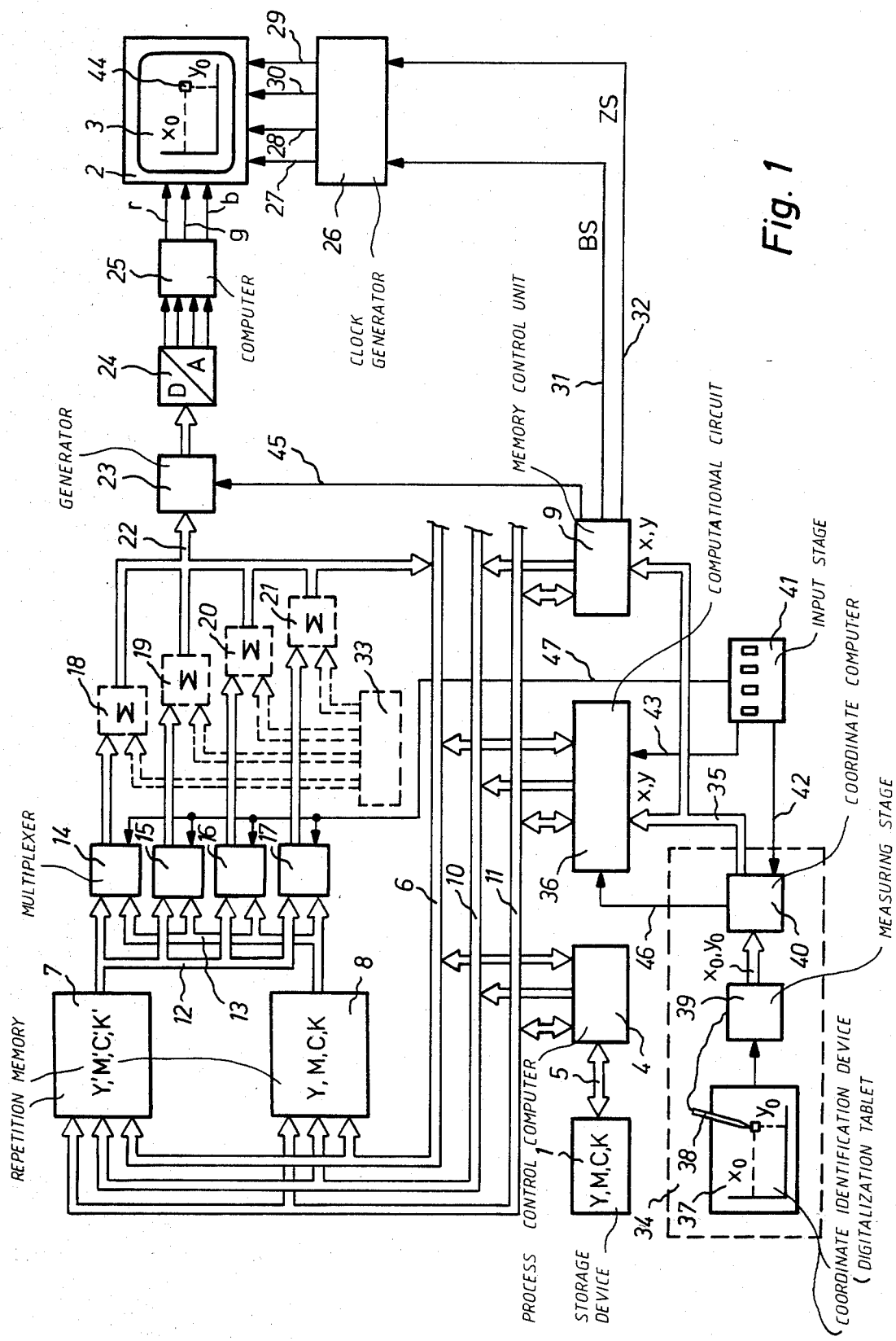
Fig. 1 illustrates a circuit arrangement for partially smoothing retouch in electronic color image reproduction, incorporatin an illustrative embodiment of the invention.
Figure 2:
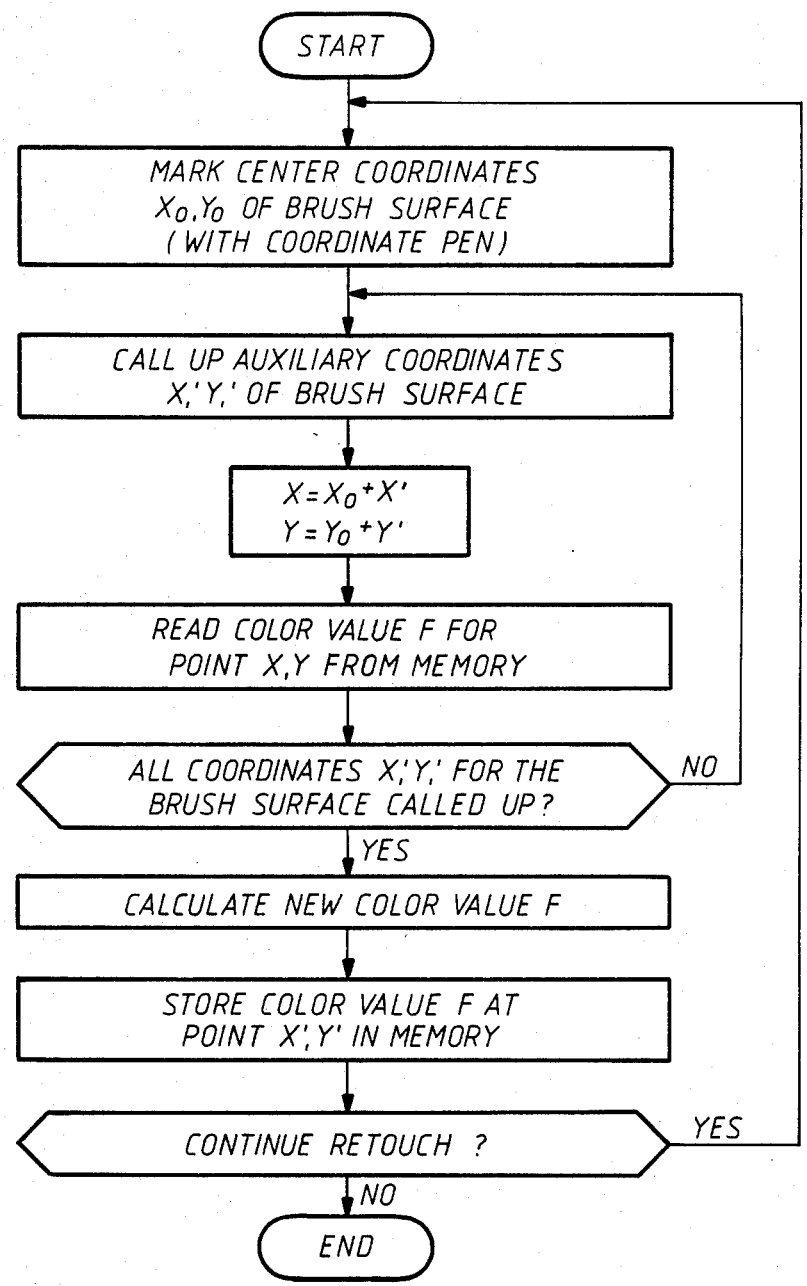
Fig. 2 illustrates a flow chart illustrating steps followed.

FIG. 1 shows the fundamental structure of a circuit arrangement for the partially smoothing retouch in electronic color image reproduction and FIG. 2 shows a flow chart illustrating the process sequence.

In the sample embodiment, a storage medium or device 1 (magnetic tape, magnetic disk, etc.) stores the digital color values Y, M, C and K which have been color-corrected in a color scanner for the color separations "yellow" (Y), "magenta" (M), "cyan" (C) and "black" (K), of an image to be reproduced.

The color values which are stored have, for example, a word length of 8 bits, so that, for example, in addition to "black" (0) and "white" (255), 254 gray scales can be distinguished. The image to be reproduced can be an individual image, as well as an assembled printing page. The color values of an individual image were previously derived by a color scanner through a point-wise and line-wise trichromatic scanning of a master, and through color correction and analog-to-digital conversion of the color separation signals. The color values of the entire printing page can be derived, for example, in a device for electronic page layout according to the GBLP No. 1,047,478 (German OS No. 21 61 038) through combination of the corrected individual image color values, according to a layout plan. Uncorrected color values, or color values which have already been retouched according to the U.S. Pat. No. 4,393,399 can also be deposited in the storage medium or device 1.

Before the recording of the color separations on film material by means of a color scanner (for offset printing, for example) or before the production of the printing forms by means of an engraving machine (such as rotogravure), the color values of the image or the color separations are subjected to a smoothing or flattening retouch under visual control.

A color monitor 2 is provided for the visual control, a picture consisting, for example, of 512×512 image points recorded on its picture screen 3. The color values Y, M, C, and K required for the representation of the color image or of a color separation to be retouched are selected or calculated from the overall data set of the memory medium 1 by means of a process control computer 4, and are transmitted, image-point-by-image-point, into two image repetition memories 7 and 8 via data buses 5 and 6. Accordingly, the image repetition memories 7 and 8 respectively exhibit a capacity of 512×512 memory locations of 8 bits each for each color separation.

Figure 13:
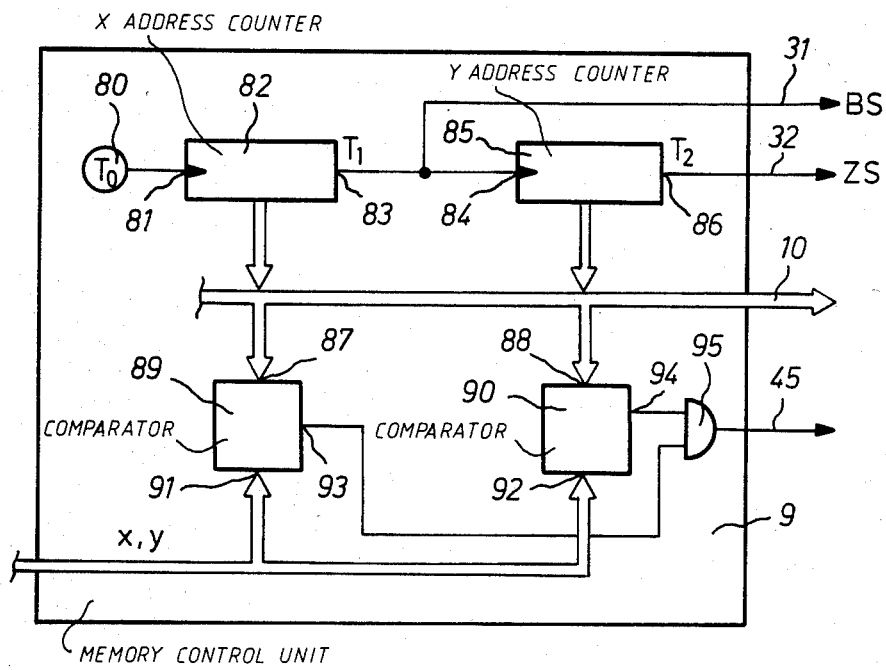
FIG. 13 illustrates a sample embodiment of a memory control unit.

In order to produce a still picture on the picture screen 3 of the color monitor 2, a memory control unit 9 cyclically calls in the XY addresses of the image repetition memories 7 and 8 via an address bus 10. FIG. 13 shows a sample embodiment of the memory control unit 9. The stored, digital color values are read out on a control bus 11, line-by-line and image-point-by-image-point within each line in synchronism with a read clock signal generated in the memory control unit 9, and are forwarded via data buses 12 and 13 to multiplexers 14, 15, 16 and 17 and adder stages 18, 19, 20 and 21, and are supplied from there to a digital-to-analog converter 24 via a data bus 22 and a light mark generator 23. The digital-to-analog converter 24 converts the digital color values into four analog color separation signals. A printing simulation computer 25 generates three drive signals r, g and b for the color monitor 2 from the analog color separation signals, to permit the printing simulation computer 25 to provide an illustrated picture conveying the chromatic impression of a polychromatic print. Such a printing simulation computer is extensively described, for example, in the GBLP No. 1,540,525 (German OS No. 26 07 623).

The recording on the color monitor 2 progresses according to the line interlacing method, in order to obtain a flicker-free picture. A clock generator 26 generates the horizontal and vertical deflection signals on lines 27 and 28 required for image production, in accord with the technique standard in television, and generates line start and image start pulses on lines 29 and 30, respectively. The memory control unit 9 supplies horizontal and vertical synchronization pulses to the clock generator 26, via lines 31 and 32, so that the image recording is synchronized with the read-out of the color values from the image repetition memories 7 and 8.

The color values read out of the image repetition memories 7 and 8 can be modified in the adder stages 18 through 21, by means of correction values which are image point-dependent, said correction values being formed in a retouch circuit 33 according to the U.S. Pat. No. 4,393,399. The retouched color values are rewritten into the memory via the data bus 6, either into the image repetition memories 7 or 8 or, via the data bus 5, into the storage device 1. The retouch circuit 33 is not the subject matter of the present invention and is therefore indicated with broken lines. It is assumed in the following descriptions that the correction values are zero.

For smoothing retouch, the image point coordinates x and y of the color values Y, M, C, and K of the image parts to be retouched, are determined in a coordinate identification device 34, and are forwarded to a computational circuit 36 via an address bus 35.

Figure 12:
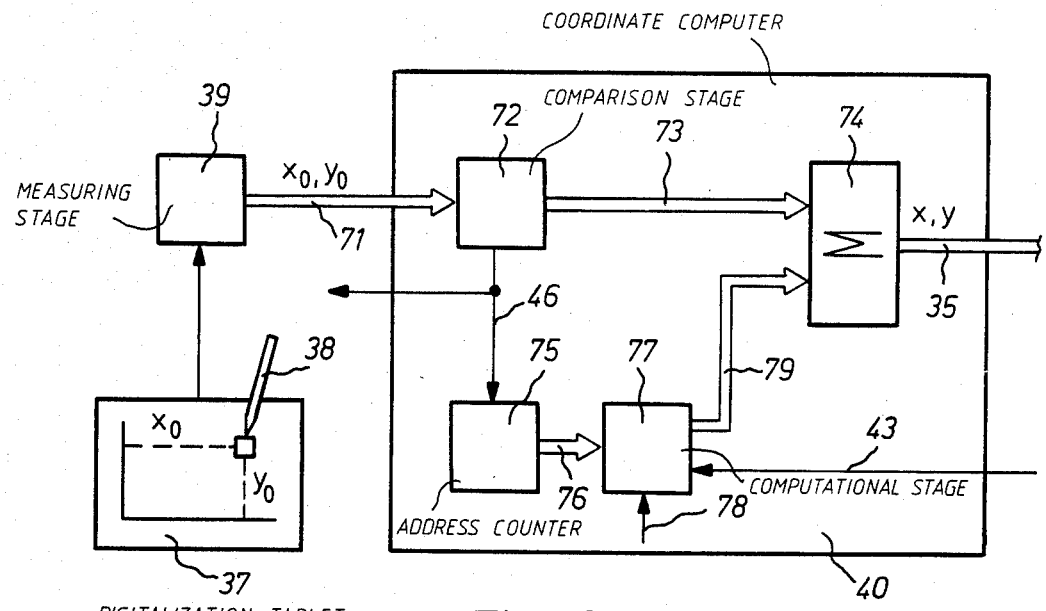
FIG. 12 illustrates a sample embodiment of a coordinate identification device.

The coordinate identification device 34 consists of a digitalization tablet 37 with a coordinate pen 38, a measuring stage 39 and a coordinate computer 40. A sample embodiment of the coordinate identification device 34 is shown in FIG. 12.

Like a retouch brush, the coordinate pen 38 is conducted by the retoucher across the part of the digitization table 37 which coincides, in terms of position, with the image parts to be retouched. Whereas the coordinate pen 38 respectively marks only one image point with the coordinates $x_0$ and $y_0$, the image point coordinates x and y of a plurality of freely selectable image points around the marked image point are simultaneously calculated in the coordinate computer 40. The image points simultaneously covered within an image point area form the brush surface of the retouch brush whose shape and size is determined by the plurality and the position of the covered image points relative to the image point marked with the coordinate pen 38.

Proceeding from an input stage 41 (FIG. 1), the size and shape of the brush surface can be prescribed via a control line 42 in the coordinate computer 40. For purposes of explanation, FIG. 3 shows some shapes of brush surfaces and FIG. 4 shows the calculation of the image point coordinates x and y on the basis of a graphic illustration.

Whereas all respective color values covered within the brush surface are changed in the retouch method specified in the German OS No. 29 20 058, only the color values of one or more selectable image points within the brush surface are to be changed, as a function of the other color values of the brush surface, in the method of the present invention. Correction zones are circumscribed within the brush surface by means of the selection of the image points whose color values are to be changed. The orientation of these correction zones within the brush surface determines the effective direction of the retouch. The effective direction can be selected by the retoucher in the computational circuit 36 via a multiple control line 43 proceeding from the input stage 41. The effective width of a retouch is determined by the correction zones and/or by the plurality of brush strokes lying next to one another.

Examples of changes of color value within the correction zones are specified hereinafter.

In order to make the brush surface in the image part to be retouched visible, a movable light mark 44 is faded into the picture screen 3 of the color monitor 2, said light mark 44 being synchronized with the motion of the coordinate pen 38 and having the size of the brush surface. To that end, the image point coordinates x and y determined in the coordinate computer 40 are also simultaneously forwarded, via the address bus 35, to the memory control unit 9, and are compared there to cyclically called-in addresses of the image repetition memories 7 and 8. Given address equality, a command "light mark" arises which is forwarded to the light mark generator 23 via a control line 45. The command "light mark" appears precisely at that point in time in which the electron beams of the color monitor 2 sweep the desired position of the brush surface on the picture screen surface. The command "light mark" activates the light mark generator 23, which briefly generates identical drive signals for the color monitor 2. By so doing, all three electron generating systems of the color monitor 2 are simultaneously switched on with the maximum possible luminance, to produce a "white" light mark 44 on the display screen.

In the following, the manner of functioning of the circuit arrangement is described in greater detail.

With the assistance of a keyboard of the input stage 41, the retoucher first determines whether the retouch is to take place in one or more color separations or in the original image, i.e., in all color separations. A command "color separation" from the input stage 41 via the multiple control line 43 to the computational circuit 36 selects the color values Y, M, C or K of the corresponding color separations.

The retoucher conducts the coordinate pen 38 or, respectively, the brush surface over the contour to be flattened in the picture, or over that image part in which the color or, respectively, tint values are to be matched to one another. The movement of the brush surface is displayed on the color monitor 2 by means of the light mark 44.

The coordinates are first identified on the digitization tablet 37 with a significantly higher resolution than the resolution of the stored and displayed image consisting of $512 \times 512$ image points, so that a high measuring precision is achieved. In the measuring stage 39, the identified coordinates are then converted to the possible $512 \times 512$ image point coordinates $x_0$ and $y_0$ or, respectively, addresses of the image repetition memories 7 and 8, and are forwarded to the coordinate computer 40.

The appertaining image point coordinates x and y of the brush surface are determined in the coordinate computer 40 from the current image point coordinates $x_0$ and $y_0$ marked by the coordinate pen 38. At the same time, successive pairs of image point coordinates $x_0$ and $y_0$ are continuously compared to one another. Given a coordinate change, which occurs at every displacement of the coordinate pen 38 by one image point, the coordinate computer 40 supplies a command "coordinate change" to the computational circuit 36 on a line 46.

The coordinate computer 40 forwards the corresponding image point coordinates x and y of the brush surface, for the individual positions of the coordinate pen 38, to the computational circuit 36. Upon each respective command "coordinate change", the computational circuit 36 addresses the image repetition memory 7 via the address bus 10 with the momentary image point coordinates x and y. The addressed color values Y, M, C and K which are assigned to the selected point color separation are transferred from the image repetition memory 7 via the data bus 6 into the computational circuit 36. In the computational circuit 36, the corresponding color values which are assigned to the correction zones of the brush surface are then changed as a function of the other color values of the brush surface and are reloaded via the data bus 6 into the image repetition memory 7 which thus contains the changed or retouched color values Y', M', C' and K', whereas the unretouched color values Y, M, C, and K are deposited in the image repetition memory 8.

In order to evaluate the retouch, the retouched color image or the original (unretouched) color image are displayed on the color monitor 2. To that end, either the retouched color values Y', M', C' and K' of the image repetition memory 7, or the unretouched color values Y, M, C, and K of the image repetition memory 8, are connected to the color monitor 2 with the assistance of the multiplexers 14 through 17.

To that end, the retoucher activates a corresponding key in the input stage 41, whereby a changeover command is forwarded to the multiplexers 14 through 17 via a control line 47.

The retouch can be cancelled, in which case the color values Y', M', C' and K' in the image repetition memory 7 addressed with the coordinate pen 38 are substituted by the topically allocated, unaltered color values Y, M, C and K of the image repetition memory 8, with the assistance of the computational circuit 36. To that end, a key in the input stage 41 is actuated, whereby a command "retraction" is forwarded to the computational circuit 36 over the multiple control line 43.

Figure 3A:
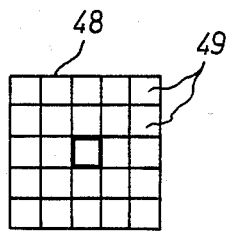
FIGS. 3a, 3b and 3c illustrate various shapes of brush surfaces.
Figure 3B:
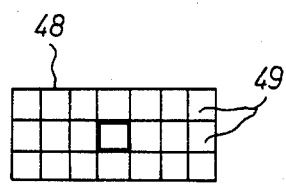
Figure 3C:
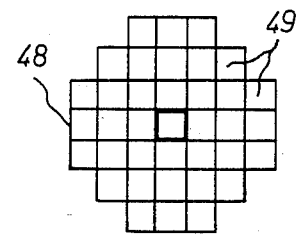
Figure 4:
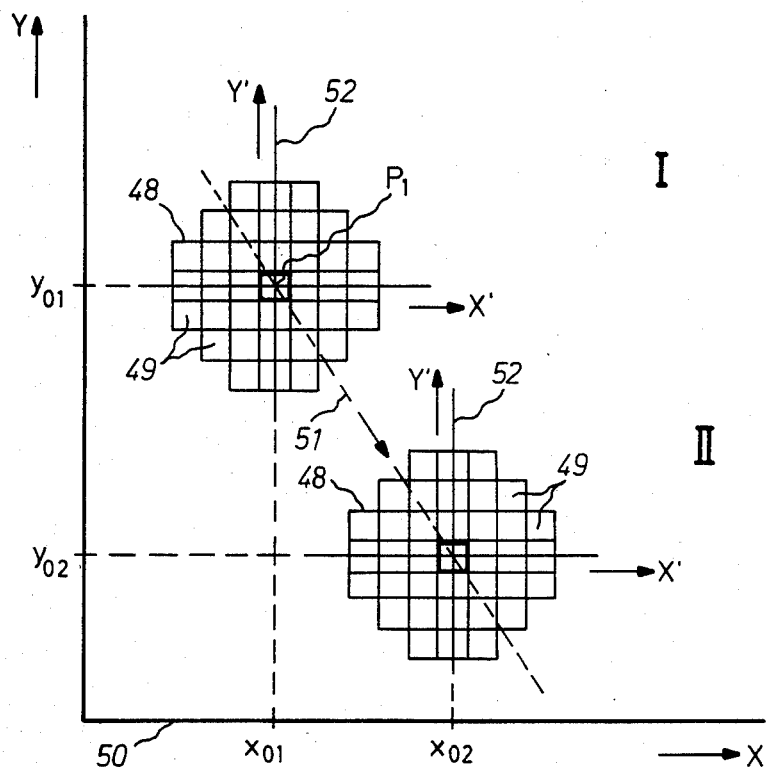
FIG. 4 shows a graphic illustration for the coordinate identification.

In order to illustrate the above-described processes, a few shapes of brush surfaces are first illustrated in FIGS. 3a - 3c.

FIG. 3a shows a square brush surface 48 which encompasses $5 \times 5$ image points 49; FIG. 3b comprises a rectangular brush surface 48 with $3 \times 7$ image points 49; and FIG. 3c encompasses a brush surface 48 with an approximately circular shape. The image points P marked with the coordinate pen 38—the respective center points of the brush surfaces 48 in the sample embodiment—are emphasized in FIGS. 3a–3c by heavy lines.

The identification of the image point coordinates x and y is explained on the basis of a graphic illustration in FIG. 4. Illustrated there is a section of the digitization tablet 37 of the coordinate identification device 34 with the two positions I and II of the brush surface 48 in an X/Y coordinate system 650. In position I, the brush surface 48 has the center point coordinates $x_{01}$ and $y_{02}$ and, in position II, it has the center point coordinates $x_{02}$ and $y_{02}$, and the points $P_1$ and $P_2$ are the points marked with the coordinate pen 38. The position II was reached by means of moving the coordinate pen 38 along a broken line 51. An X'-Y' auxiliary coordinate system 52 is allocated to the brush surface 48, said system 52 respectively proceeding through the center point P of the brush surface 48. In the X'-Y' auxiliary coordinate system 52, the auxiliary coordinates x' and y' are fixed for those those image points which participate in the formation of the brush surface 48 with respect to the shape and size of the brush surface. The corresponding, running image point coordinates x and y derived for the individual, momentary positions of the brush surface 48 in the X-Y coordinate system 50 are:

$$x = x_0 + x'$$
$$y = y_0 + y' \quad (1)$$

In the following, a few sample embodiments of the color value changes within the correction zones of the brush surface 48 are described on the basis of applied examples.

In a first embodiment, the color value—referred to below as marginal values—of at least two preferably diametrically opposite image points at the periphery of the brush surface 48—referred to below as margin points—are fixed and the color values of the image points lying on the line connecting the diametric margin points are matched, either linearly or according to a prescribed function, to the marginal values.

FIG. 5, by way of example, shows a square brush surface 45 which encompasses n×n image points 49 (n=5) or, respectively, n×n color values Y, M, C or K which are referred to in common below as F. Illustrated within the brush surface 48, moreover, are four selected correction zones 53 which respectively exhibit a pair of magin points with the color values $F_1$ and $F_n$. The correction zones 53 lie on four lines 54 (0°), 55 (45°), 56 (90°) and 57 (135°) rotated relative to one another which represent four different effective directions for a change of color value within the brush surface 48. In the illustrated example, a correction zone 53 is thus one image point wide and i=(n-2) image points long, since the marginal values $F_1$ and $F_n$ themselves are not to be changed. The length of a correction zone 53 can be varied by the size of the brush surface 48.

In the selected example, the change of the color values $F_i$ of the image points i=1 through i=(n-1) within each correction zone 53 between the marginal values $F_1$ and $F_n$ is carried out by means of linear interpolation according to the equation:

$$F_i = \frac{(n - i) F_1 + (i - 1) F_n}{(n - 1)} \quad (2)$$

Of course, the color values $F_i$ can also be distorted according to a prescribed function.

When in the flattening of a contour, the coordinate pen 38 or, respectively, the brush surface 48 is moved along this contour, the effective direction should always proceed approximately perpendicular to the contour, in order to achieve the favorable correction effect. This can proceed, for example, by selection of the effective direction of the correction zones by the retoucher, or by means of an automatic contour recognition within the brush surface 48. Given the course of a contour 48 indicated in FIG. 5 by a broken line, the correction zone 53 would be selected in the direction of line 54 in the illustrated position of the brush surface 48. Of course, if desired, all correction zones 53 of the brush surface 48 can be simultaneously effective.

As applied examples of the first method form according to FIG. 5, the flattening of contours (FIGS. 6a and 6b) and the smoothing of image surfaces (FIGS. 7a and 7b) are described.

FIGS. 6a and 6b first show the flattening of a contour on the basis of a further, graphic illustration.

In FIG. 6a, an image excerpt 59 from an image to be retouched is illustrated, in which each square corresponds to one image point 49 and the entered value corresponds to the associated color value F. Large color value changes occur along the contour 58. Shown above the image excerpt 59 is a correction zone 53 of the brush surface 48 whose effective direction proceeds perpendicular to the contour 48 and which is moved across the image excerpt 59 in the direction of the arrow for flattening the contour 58. The correction zone 53 covers three image points 49 lying next to one another.

The color value profile 60 perpendicular to the contour 58 is illustrated next to the trimmed image 59.

The flattening of the contour 58 takes place by means of moving the brush surface 48 or, respectively, the correction zone 53 along the contour 58.

The result of the flattening is illustrated in FIG. 6b.

The trimmed image 59' shows the changed color values within the correction zone 53 of the brush surface 48, and the corresponding color value profile 60' of the flattened contour 58' which has the width of the correction zone 53. If desired, the color values between the marginal values may be distorted according to a prescribed function, as indicated in the color value profile 60' by means of a broken line 61.

Figure 7A:
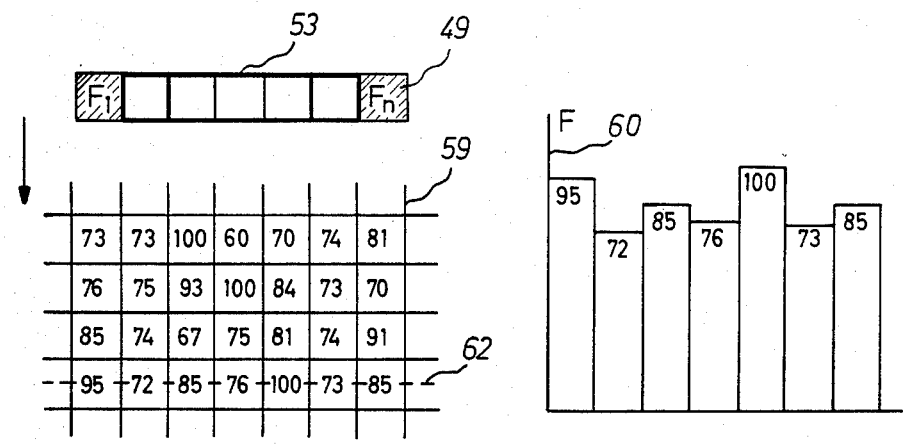
FIGS. 7a and 7b show a graphic illustration for the smoothing of image surfaces.
Figure 7B:
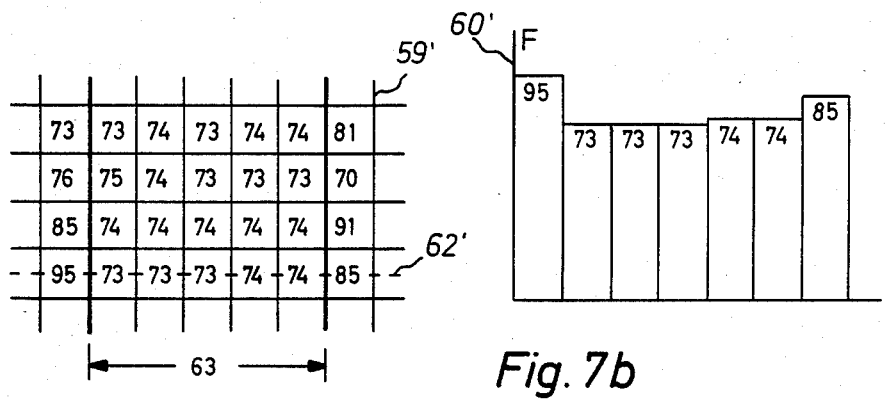

As an applied example of the smoothing method, FIGS. 7a and 7b show the partial matching of different color values (smoothing of noise-infested surfaces) according to equation (2) set forth above.

An image excerpt 59 is again shown in FIG. 7a with different color values F which are to be matched in one another.

The color value profile 60 along a line 62 of the trimmed image 59 is shown next to the trimmed image 59. A correction zone 53 of the brush surface 48 which covers five image points 49 is shown above the image excerpt 59. For smoothing the surface, the correction zone 53 is moved across the trimmed image 59 in the direction of the arrow.

FIG. 7b shows the result of the matching. Within the effective width of the correction zone 53, indicated by the line 63, the color values F were matched to one another according to equation (2), as proceeds from the trimmed image 59' and the appertaining color value profile 60'.

In the applied examples described in FIGS. 6 and 7, the color values covered by the correction zone are changed by means of a single sweep with the retouch brush. Repeated sweep of the same image area produces no further color value changes. The effective width, in contrast thereto, can be expanded by means of enlarging the correction zone and/or by repeated brush motions which lie next to one another.

It can occur that, for example, due to film grain, noise or due to light reflexes in the image part to be retouched, the marginal value deviates widely in amplitude from the color values of the image points surrounding the margin point, which would lead to errors in the interpolation according to equation (2). In this case, it proves particularly advantageous to not proceed from the marginal values $F_1$ and $F_n$ themselves in the interpolation but, rather, to determine the initial values $F^*_1$ and $F^*_n$ for the interpolation calculation using the mean value of the color values $F_{ui}$ or $F_{vi}$ of the image points surrounding the margin points.

Figure 8:
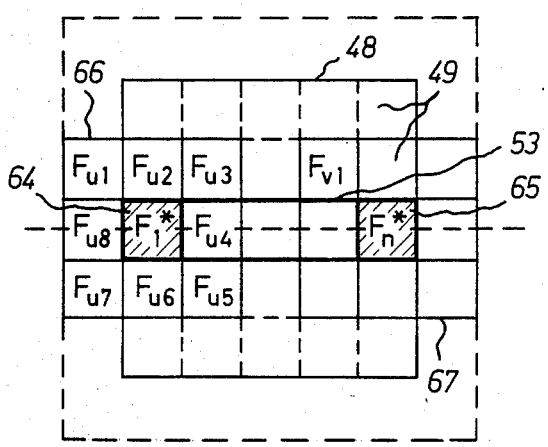
FIG. 8 illustrates a brush surface with an image point environment.

To this end, FIG. 8 again shows the brush surface 48 consisting of n×n image points 49 (n =5) and a correction zone 53 with the margin points 64 and 65 and their margin point environment 66 and 67 consisting of respectively m image points 49 (m=8).

The average initial values $F^*_1$ and $F^*_n$ are then:

$$F^*_1 = \frac{1}{m+1}\left[\sum_{i=1}^{m} F_{ui} + F_1\right] \quad (3)$$

$$F^*_n = \frac{1}{m+1}\left[\sum_{i=1}^{m} F_{vi} + F_n\right]$$

In this case, the interpolation calculation is made according to the equation (4).

$$F_i = \frac{(n-1)F^*_1 + (i-1)F^*_n}{(n-1)} \quad (4)$$

In an advantageous manner, the length of a correction zone 53 can be expanded from (n−2) to n image points when the original margin points $F_1$ and $F_n$ are replaced by the corresponding means values $F^*_1$ and $F^*_n$.

In another embodiment of the smoothing method, the color values of the image points lying within a correction zone 53 are replaced by a color value $F^*_o$ calculated from the color values $F_i$ of the image points covered by the brush surface 48. This may be, for example, by the mean value of the all image points of the brush surface.

For example, FIG. 9 shows a square brush surface 48 consisting of p image points 49 (p=9). The correction zone 53 here consist of an image point with the color value $F_0$ in the central range of the brush surface 48. This color value $F_0$ is replaced by a color value $F^*_0$ which is calculated according to equation (5) from the color values $F_i$ and $F_0$ of all image points of the brush surface 48.

$$F^*_o = \sum_{i=1}^{P} a_i F_i + a_o F_o \quad (5)$$

In equation (5), $a_i$ and $a_0$ are weighting factors for which the secondary condition $a_i + a_0 = 1$ is valid. The weighting factors can specify the percentile share of the color values or, on the other hand, can take the spatial distance of the image points relative to one another into consideration.

For simplification, the color value $F^*_0$ to be substituted is to be calculated by means of a mean value formation. In this case, $a_i = a_0 = 1/p$ and the equation (5) becomes simplified to:

$$F^*_o = \frac{1}{P} \cdot \sum_{i=1}^{P} F_i + F_o \quad (6)$$

Figure 10:
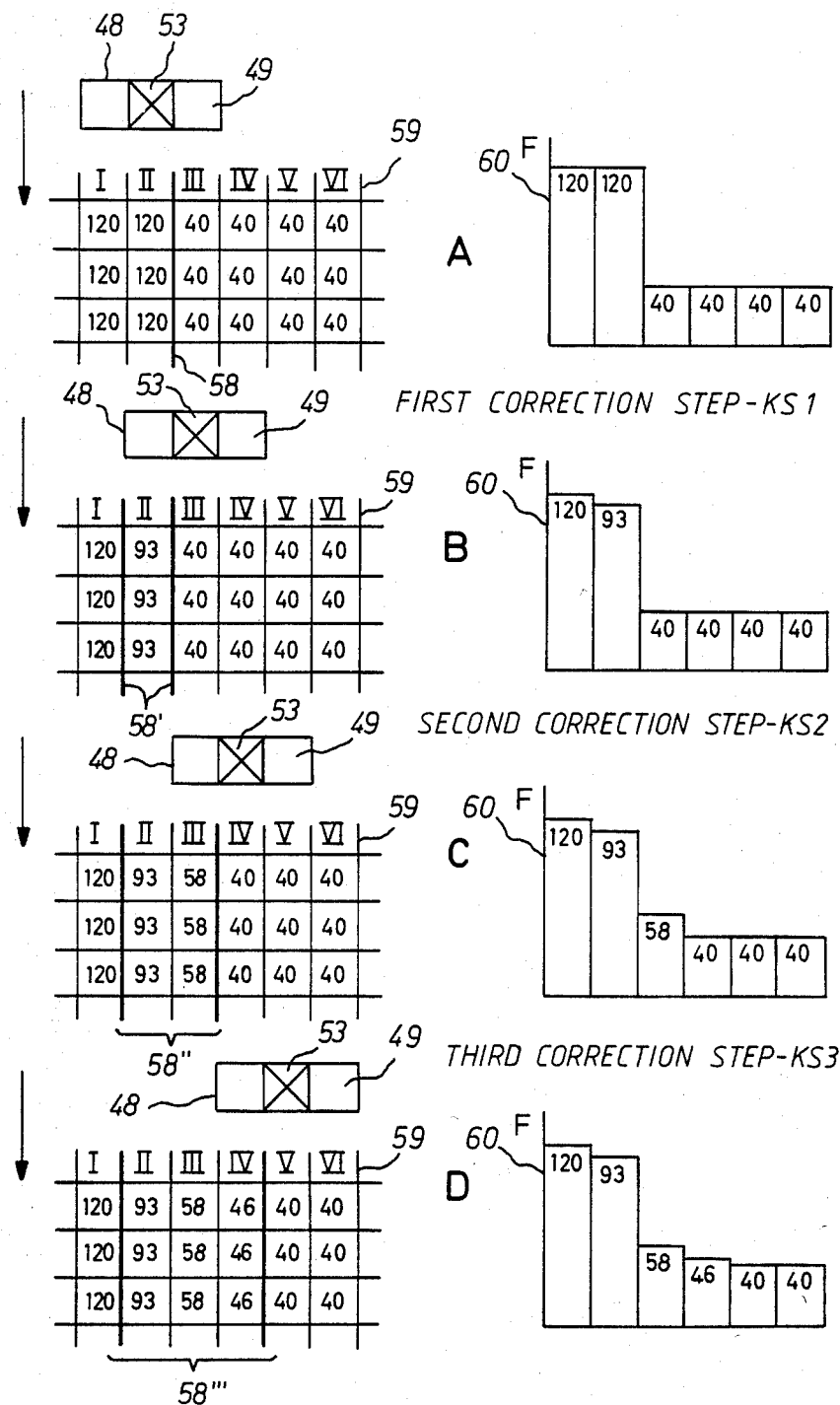
FIG. 10 shows graphic illustrations for the flattening of contours.
Figure 11:
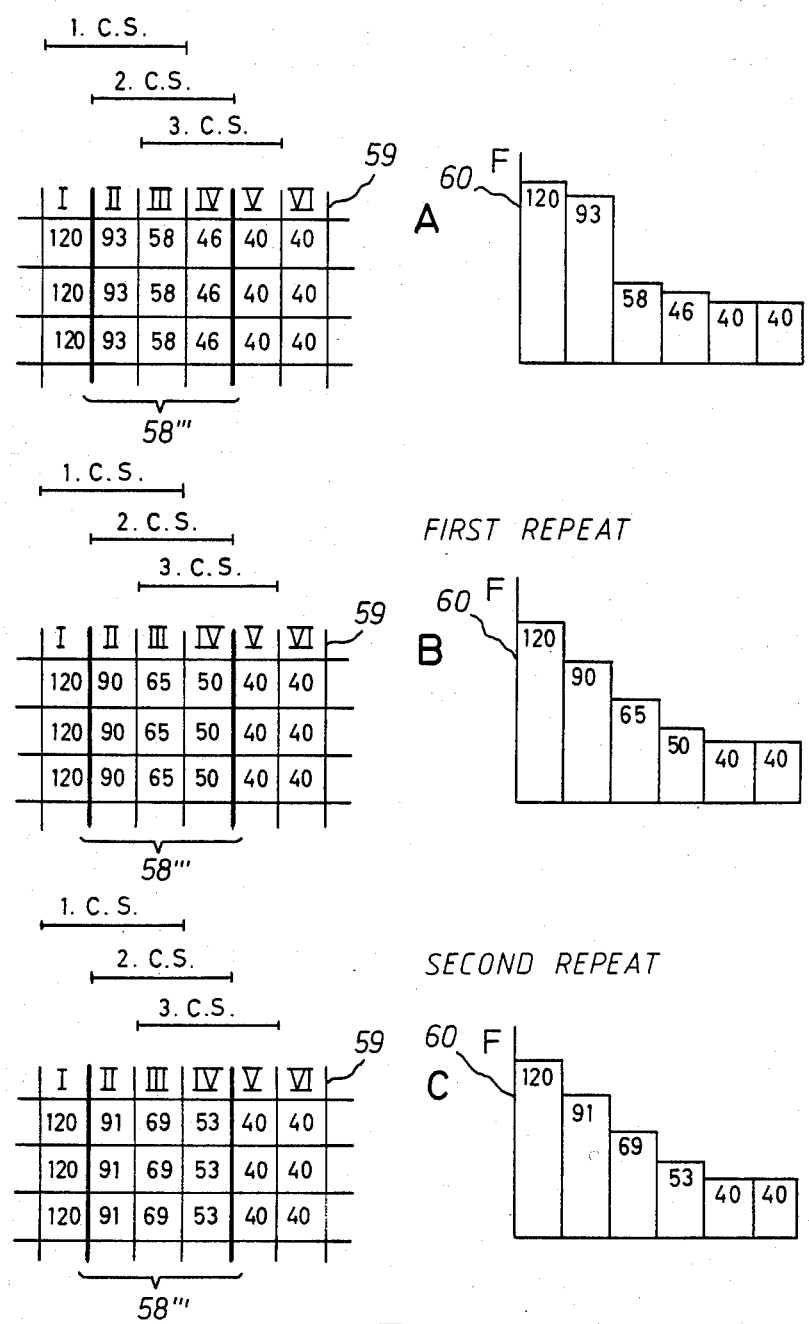
FIG. 11 shows further graphic illustrations.

An applied example of equation (5) or (6) is the flattening of contours illustrated in FIGS. 10 and 11.

For the purpose of explaining a contour flattening, FIGS. 10 and 11 show trimmed images 59 from the image to be retouched during the retouch and the appertaining color value profiles 60.

A brush surface 48, consisting of three image points 49 with a central correction zone 53 consisting of one image point, is indicated above the trimmed images 59 in various positions during the individual correction steps shown in part B-D of FIG. 10. The color value $F_o$ of the correction zone 53 is replaced by the mean value $F^*_o$ formed from the color values of the three image points.

FIG. 10a shows the unretouched trimmed image 59 with a sharp contour 58 as can be seen from the entered color values and from the color value profile 60. For the purpose of flattening the sharp contour 58, the retoucher conducts the correction zone 53 of the brush surface 48 across the trimmed image 59 to be retouched in the direction of the arrow in a plurality of correction steps and respectively displaces the brush surface or, respectively, the correction zone 53 by one image point perpendicular to the arrows after each correction step. The changes of color value achieved after the individual correction steps, the sharp contour 58—FIG. 10a— has been flattened to an area 58''' which is three image points wide. By means of complementary correction steps toward the left and right, the area 58' can be further expanded.

If skips in color value which are still too great occur within the area 58', the correction steps with the area 58' can be repeated as often as desired in order to obtain as linear as possible a transistion, as is illustrated in FIGS. 11a-11c.

FIG. 11a shows a trimmed image 59 with a color value distribution which is identical to the color value distribution in FIG. 10d. FIGS. 11b and 11c show the results after two repetitions of the correction steps (K.S.) carried out in FIG. 10, whereby each repetition consists of three correction steps. It can be seen from FIG. 11c that a linearization of the color values has occurred with the area of 58'''.

The embodiment of FIGS. 9-11 can also be employed for smoothing noise-infested image surfaces, described in FIG. 7.

FIG. 12 shows a sample embodiment of the coordinate identification device 34 according to FIG. 1.

The center points P of the brush surface 48 (FIG. 4) are marked on the digitization tablet 37 with the coordinate pen 38 and the measuring stage 39 forwards the identified image point coordinates $x_0$ and $y_0$ to an adder stage 74 via a data bus 71, a comparison stage 72 and via a further data bus 73. In the comparison stage 72, successive pairs of center point coordinates $x_0$ and $y_0$ are continuously compared to one another. Given a change of coordinates which occurs upon displacement of the coordinate pen 38, the comparison stage 72 supplies the command "coordinate change" to an address counter 75 over the line 46. The address counter 75, respectively started by the command "coordinate change", calls all possible coordinates of the X'-Y' auxiliary coordinate system 52, cyclically and line by line, these being supplied via a data bus 76 to a computational stage 77. Via a programming input 78, the desired brush surface 48 according to one of the FIGS. 3a-3c. The coordinates called in by the address counter 75 are examined in the computational stage 77 to determine whether they fall within the brush surface 48. When this is the case, the coordinates which have been called in are a matter of auxiliary coordinates x' and y' of the brush surface 48. The auxiliary coordinates x' and y' are forwarded, via a data bus 79, to the adder stage 74 in which the image point coordinates x and y are formed in accord with equation (1). The image point coordinates x and y arrive via the data bus 35 at the computational circuit 36 and at the address control unit 9 of the circuit arrangement according to FIG. 1.

FIG. 13 shows a sample embodiment of the memory control unit 9 according to FIG. 1.

The memory control unit 9 contains a clock generator 80 which counts a counting clock sequence $T_0$ into a X address counter 82 via a counting input 82. The X address counter 82 is a 9 bit binary counter and addresses the X addresses from 0 through 511 of the image repetition memories 7 and 8 via the address bus 10. After 511 counted clocks, a pulse $T_1$ appears at the output of the X address counter 82, said pulse $T_1$ being counted into a Y address counter 85 via a counting input 84. The Y address counter 85 is likewise a 9 bit binary counter and addresses the corresponding Y addresses from 0 through 511 of the image repetition memories 7 and 8 via the address bus 10. At its output 86, the Y address counter 85 likewise generates a pulse $T_2$ after 511 pulses have been counted in. The line start pulses (ZS) and the image start pulse (BS) on the lines 31 and 32 are derived for the image recording from the pulses $T_1$ and $T_2$ Via the address bus 10, the X address counter 82 and the Y address counter 85 are connected to the first comparison inputs 87 and 88 of comparators 89 and 90. The second comparison inputs 91 and 92 of the comparators 89 and 90 receive the image point coordinates x and y which are supplied from the coordinate computer 40 via the data bus 35. The signal outputs 93 and 94 of the comparators 89 and 90 are connected to one another via and AND gate 95. Given equality of the addresses, the signal "light mark" appears on the line 45, so that the light mark 44 on the picture screen 3 is synchronized with the movement of the coordinate pen 38 of the coordinate identification device 34.

The present invention is advantageously employed in the entire field of electronic reproduction, particularly in the field of color image reproduction, by means of electronic color scanners and image processing systems, and is advantageously employed for the production of retouched and corrected printing forms in the form of color separations or print cylinders.

What is claimed is:

1. A method for partially smoothing retouch of color images in electric color image reproduction, in which the color images are scanned opto-electronically and trichromatically, image point by image point, to obtain color signals, and in which the color signals are digitized into data representing color values ($F_1$; $F_n$) for each image point, with said data being stored in a storage device, comprising the steps of:
   (a) identifying simultaneously a plurality of image points within a part of the color image to be smoothed, said plurality of image points forming an image point area, said image point area being displaceable over the part of the color image to be smoothed;
   (b) selecting at least one image point within said image point are, said selected image point forming at least one correction zone within said image point area;
   (c) accessing from said storage device the data representing color values of said identified image points; and
   (d) changing the data representing color values of the image points within said correction zone in dependence on the color values of image points within sections lying adjacent to said correction zone within said image point area under visual control.

2. The method according to claim 1, wherein said correction zone within said image point area has a selectable size and including the step of determining the simultaneously smoothed region within the part of the color image to be smoothed by selecting the size of said correction zone, and selecting the image points for which said data is to be changed along an effective direction in accordance with the direction of greatest width of said correction zone.

3. The method according to claim 1, wherein said image point area and said correction zones therein have centers; and including the steps of:
   (a) selecting a plurality of correction zones within said image point area, each correction zone having different size and the direction of greatest width of each correction zone defining the effective direction of smoothing;
   (b) positioning the centers of the correction zones in the center of said image point area; and
   (c) turning the correction zones relative to one another around the center of said image point area.

4. The method according to claim 3, including the step of determining the desired effective direction of smoothing by selecting the shape of the corresponding correction zone.

5. The method according to claim 4, wherein the part of the color image includes a contour to be smoothed; and including the step of selecting the shape of the correction zone in such a manner that the effective direction of smoothing of said selected correction zone is approximately perpendicular to the direction of said contour.

6. The method according to claim 5, including the steps of:
   (a) identifying the direction of said contour from the color values of said image point area; and
   (b) controlling the selection of the correction zone by the identified direction of said contour.

7. The method according to claim 1, including the steps of:
   (a) determining an initial value for each group of image points lying adjacent to said correction zone from the color values of at least one image point within the section; and
   (b) calculating a plurality of retouched color values ($F_i$) of the image points within said correction zone from said determined initial values.

8. The method according to claim 7, including the step of determining the initial values to correspond to the color values ($F_1$; $F_n$) of the image points within said sections.

9. The method according to claim 7, including the steps of:
   (a) calculating a means value ($F_1^*$; $F_n^*$) for each section from the color values ($F_{ui}$; $F_{vi}$) of the image points surrounding said one image point within said section; and
   (b) determining the initial values to correspond to said calculated mean values ($F_1^*$; $F_n^*$).

10. The method according to claim 7, including the step of calculating the retouched color values ($F_i$) of the image points within said correction zone from said determined initial values by means of interpolation between said initial values.

11. The method according to claim 7, including the step of calculating the retouched color values ($F_i$) of the image points within said correction zone according to a prescribed function.

12. The method according to claim 9, including the step of replacing the color values ($F_1$; $F_n$) of the image points of said sections by the calculated mean values ($F_1^*$; $F_n^*$) in order to enlarge the image point area.

13. The method according to claim 1, including the step of replacing the color values of the image points within said correction zone by one color value ($F_O$) calculated from the color values of the image points within said image point area.

14. The method according to claim 1, including the steps of:
   (a) marking a coordinate pair ($x_O$, $y_O$) of at least one image point within said image point area by means of a marking device of a coordinate identification device; and
   (b) identifying simultaneously the plurality of image points within said image point area by calculating the coordiate pairs (x, y) of the image points surrounding said marked image point as a function of the coordinate pair ($x_O$, $y_O$) of said marked image point.

15. The method according to claim 14, including the step of determining a desired shape and size of said image point area by selecting the image points around said marked image point whose coordinate pairs (x, y) are to be calculated from the coordinate pair ($x_O$, $y_O$) of said marked image point.

16. The method according to claim 14, including the steps of
   (a) displaying said color image on a monitor for visuable control,
   (b) generating a displacable light mark on the picture screen of said monitor; and
   (c) synchronizing the movement of said light mark with the movement of said marking device of said coordinate identification device, said light mark indicating said image point area identified by means of said marking device.

17. The method according to claim 1, including the step of cancelling the smoothing retouch by changing back the changed color values to the original color values of said color image.

* * * * *

REEXAMINATION CERTIFICATE (2492nd)

United States Patent [19]
Hennig et al.

[11] B1 4,516,155
[45] Certificate Issued  Feb. 28, 1995

[54] METHOD FOR PARTIALLY SMOOTHING RETOUCH IN ELECTRONIC COLOR REPRODUCTION

[75] Inventors: Eberhard Hennig, Ascheberg; Jürgen Klie, Toekendorf; Klaus Wellendorf, Kitzeberg, all of Germany

[73] Assignee: Rudolf Hell GmbH, Germany

Reexamination Request:
No. 90/003,479, Jun. 7, 1994

Reexamination Certificate for:
Patent No.: 4,516,155
Issued: May 7, 1985
Appl. No.: 358,850
Filed: Mar. 17, 1982

[30] Foreign Application Priority Data
Mar. 17, 1981 [DE] Germany .................. 3110222

[51] Int. Cl.⁶ .................................. H04N 1/46
[52] U.S. Cl. ...................... 358/531; 358/501; 358/518
[58] Field of Search .......... 258/500, 501, 504, 505, 258/518, 521, 524, 525, 531; 395/118, 131

[56] References Cited
PUBLICATIONS

Alvy Ray Smith, Computer Graphics Lab, New York Institute of Technology; "Paint", Technical Memo No. 7, Jul. 20, 1978.

*Primary Examiner*—Edward L. Coles, Sr.

[57] ABSTRACT

A method for smoothing retouch in electronic color image reproduction employs a coordinate pen used by the retoucher as a retouch brush, to identify image point coordinates within an image point area. The color values associated with the image point coordinates are changed as a function of the color values of the nearby image point coordinates. The size of the areas which have their color values changed is operator-selectable. The color values of the areas which are changed can be matched to the marginal values of the area, or may be replaced by a mean value of the color values within the area. By this means image contours may be flattened, and the effective noise in the image surfaces may be minimized.

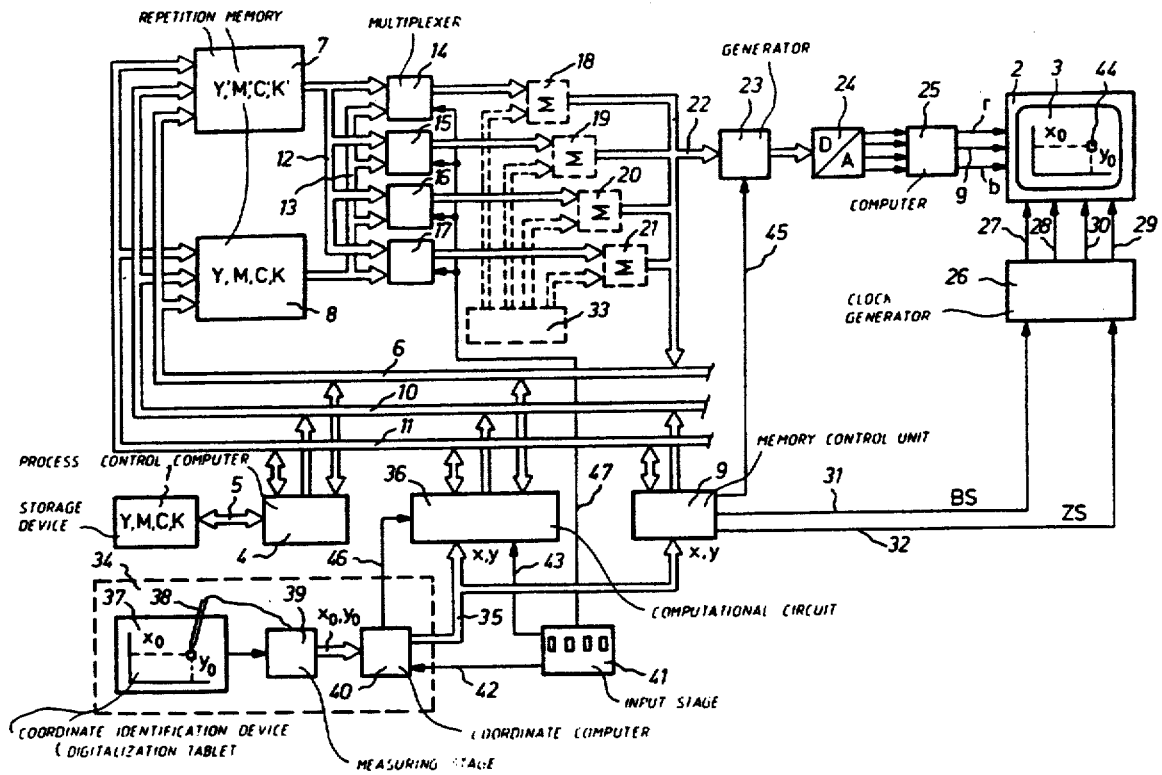

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-17 dependent on an amended claim, are determined to be patentable.

New claims 18-21 are added and determined to be patentable.

1. A method for partially smoothing retouch of color images in electric color reproduction, in which the color images are scanned opto-electronically and trichromatically, image point by image point, to obtain color signals, and in which the color signals are digitized into data representing color values ($F_1$; $F_n$) for each image point, with said data being stored in a storage device, comprising the steps of:
   (a) identifying simultaneously a plurality of image points within a part of the color image to be smoothed, said plurality of image points forming an image point area, said image point area being displaceable over the part of the color image to be smoothed;
   (b) selecting [at least one image point] *a plurality of image points* within said image point [are] *area*, said selected image [point] *points* forming at least one correction zone within said image point area;
   (c) accessing from said storage device the data representing color values of said identified image points; and
   (d) changing the data representing color values of the image points within said correction zone in dependence on the color values of image points within sections lying adjacent to said correction zone within said image point area under visual control.

*18. A method for partially smoothing retouch of color images in electric color image reproduction, in which the color images are scanned opto-electronically and trichromatically, image point by image point, to obtain color signals, and in which the color signals are digitized into data representing color values ($F_1$; $F_n$) for each image point, with said data being stored in a storage device, comprising the steps of:*

*(a) identifying simultaneously a plurality of image points within a part of the color image to be smoothed, said plurality of image points forming an image point area,*
   *said image point area being displaceable over the part of the color image to be smoothed;*
   *(b) selecting at least one image point within said image point area, said selected image point forming at least one correction zone within said image point area;*
   *(c) accessing from said storage device the data representing color values of said identified image points;*
   *(d) changing the data representing color values of the image points within said correction zone in dependence on the color values of image points within sections lying adjacent to said correction zone within said image point area under visual control; and*
   *(e) said correction zone within said image point area has a selectable size and including the step of determining the simultaneously smoothed region within the part of the color image to be smoothed by selecting the size of said correction zone, and selecting the image points for which said data is to be changed along an effective direction in accordance with the direction of greatest width of said correction zone.*

*19. A method for partially smoothing retouch of color images in electric color image reproduction, in which the color images are scanned opto-electronically and trichromatically, image point by image point, to obtain color signals, and in which the color signals are digitized into data representing color values ($F_1;F_n$) for each image point, with said data being stored in a storage device, comprising the steps of:*

*(a) identifying simultaneously a plurality of image points within a part of the color image to be smoothed, said plurality of image points forming an image point area, said image point area being displaceable over the part of the color image to be smoothed;*
   *(b) selecting a plurality of image points within said image point area, said selected image points forming at least one correction zone within said image point area;*
   *(c) accessing from said storage device the data representing color values of said identified image points;*
   *(d) changing the data representing color values of the image points within said correction zone in dependence on the color values of image points within sections lying adjacent to said correction zone within said image point area under visual control; and*
   *(e) said correction zone within said image point area having a selectable size, and determining the simultaneously smoothed region within the part of the color image to be smoothed by selecting the size of said connection zone.*

*20. The method according to claim 1 wherein color values within the correction zone increase from one side of the correction zone to the opposite side when the color values of the image points within a section lying adjacent said correction zone at said one side are lower than the color values within a section lying adjacent said correction zone at said opposite side.*

*21. The method according to claim 20 wherein the increase of the color values in the correction zone is linear.*

* * * * *